Nov. 16, 1965 T. D. COE 3,217,793

HEAT TRANSFER

Filed Nov. 30, 1962

INVENTOR.

THOMAS D. COE

BY

Ezekiel Wolf, Wolf & Greenfield

ATTORNEYS

United States Patent Office 3,217,793
Patented Nov. 16, 1965

3,217,793

HEAT TRANSFER

Thomas D. Coe, Winchester, Mass., assignor to Wakefield Engineering, Inc., Wakefield, Mass., a corporation of Massachusetts Filed Nov. 30, 1962, Ser. No. 241,409
5 Claims. (Cl. 165—80)

This invention relates in general to heat transfer and more particularly to means for efficiently cooling semiconductor devices. Heat transfer means according to the invention is relatively easy and inexpensive to fabricate while providing a relatively large area to facilitate efficient and rapid heat transfer.

The development of semiconductor and other similar devices has led to devices so compact that the ancillary apparatus required to cool such devices has limited further miniaturization of much electronic circuitry.

Accordingly, an important object of this invention is to provide compact heat transfer means having relatively large surface areas to provide efficient and rapid heat transfer while being relatively easy and inexpensive to fabricate.

It is another important object of this invention to provide a cooler in accordance with the preceding object which allows convenient, easily accessible mounting of semiconductor devices in positions such that efficient cooling is obtained.

A heat transfer structure according to the invention has a mounting base with first and second spaced substantially parallel axes passing through the base. One or more means on the mounting base receives a component to be heat regulated in a position intermediate the base axes. A plurality of fins are formed as an integral part of the base and extend outwardly from each of the base axes. This structural arrangement minimizes the thermal resistance between a component mounted on a base and the fins by providing an exceptionally short path between the component and the root of each fin. The ratio of fin area exposed to the air or other heat transfer medium relative to the volume occupied by the heat transfer device is very high. Still another feature of the invention resides in its formation as a unitary structure by extrusion to insure good thermal contact among the different portions of the device while reducing fabrication problems, costs and time.

Other features, objects and advantages of the invention will be better understood and appreciated from the following detailed description of one embodiment thereof selected for purposes of illustration and shown in the accompanying drawing, in which.

Figure 1:
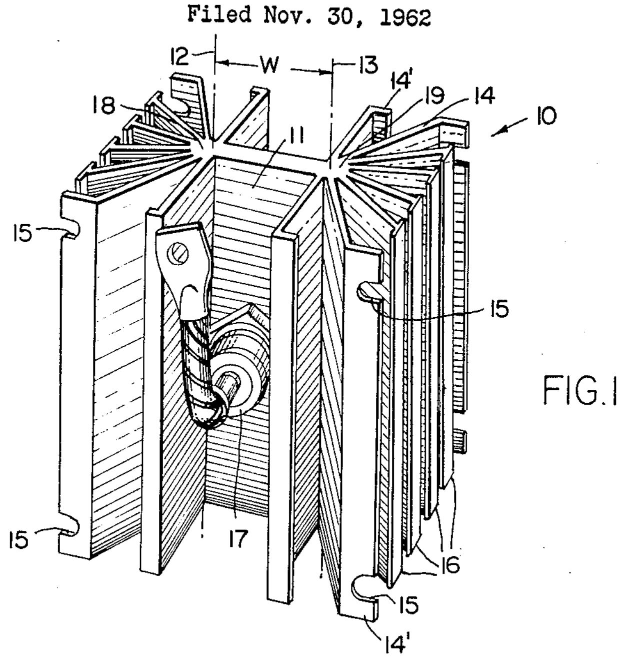
FIG. 1 is a perspective view of a preferred embodiment of a cooler constructed in accordance with this invention.
Figure 2:
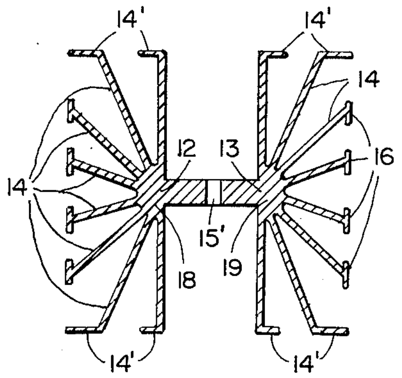
FIG. 2 is a cross sectional view thereof.

With reference now to the drawings and in particular to FIGS. 1 and 2, a cooler is designated generally at 10. The cooler 10 is an integral extruded structure composed of materials which have high thermal conductivity such as aluminum, copper and their alloys.

The cooler 10 has a planar rectangular mounting base 11 defining enlargements 18 and 19 on either side of the base having first and second spaced parallel axes 12 and 13 respectively.

An attachment means such as bore 15' extends transversely through the mounting base 11, for receiving the attachment stud of a component to be cooled, such as a semiconductor device 17, secured to the mounting base by suitable means such as lock nuts. Preferably the mounting base has a width W as shown in FIG. 1, equal to or slightly greater than the diameter of the semiconductor device 17, thus spacing the semiconductor device as close as possible to each of the axes 12 and 13. The fins have free outer ends which are noninterconnected with each other as clearly seen in the drawing. In some embodiments of the invention plural mounting bores may be utilized permitting mounting of several components to be heat regulated on the cooler.

Integral longitudinally extending radial fins 14 extend outwardly from each of the axes 12 and 13. Preferably eight fins 14 are provided about each of the axes 12 and 13 with each fin lying in a plane passing through or closely adjacent an axis and with the innermost fin of each group of fins lying on or outwardly of a plane substantially perpendicular to the mounting base 11.

Each fin 14 has a wing or projection each as angled wings 14' and T-shaped projections or wings 16. The wings 14' and 16 increase the surface area of the fins and provide large heat exchange areas for transferring heat to a surrounding fluid medium which is normally air.

Mounting notches 15 are provided in four corner fins for mounting the cooler 11 against a flat surface or alternatively on mounting lugs in a vertical or horizontal position.

Preferably all of the fins 14 have a constant length equal to the height of the mounting base 11, thus providing top and bottom portions of the cooler lying on parallel planes.

Planar side configurations of the cooler are defined by the outer tips of the fins 14 which are of selected varying radial lengths allowing the cooler 11 to be mounted in a compact square or rectangular area.

In the preferred embodiment of the invention, cooler 10 has an overall height of 5.55 inches, an overall width of 4.75 inches and an overall depth of 4.50 inches. The cooler is made of extruded aluminum and has an overall surface area of 400 square inches. This cooler has a natural convection thermal resistance of 0.54° c./w. at 100 watts which is ideal for cooling devices such as rectifiers.

Figure 3:
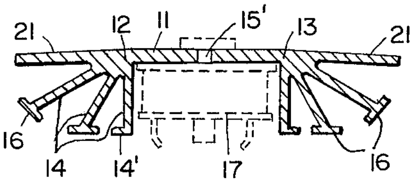
FIG. 3 is a cross sectional view of an alternate embodiment of a cooler of this invention.

With reference now to FIG. 3 an alternate embodiment of the invention is designated at 20. Cooler 20 is constructed in a similar manner to cooler 10. However, all of the fins 14 lie on the single side of the planar mounting base 11, whereas in cooler 10, the fins 14 extend on both sides of the mounting base 11. Fins 21 lie on either side of base 11 and are offset at a slight angle to the plane of the base. In this embodiment, no wings are provided on fins 21.

The cooler 20 can be mounted with the upper side (as seen in FIG. 3) of the base 11 directly abutting a flat mounting surface over its entire area. In this case the mounting surface acts as an additional heat dissipation means in conjunction with the fins 14.

It is a feature of the structure of this invention that the coolers are conveniently fabricated by relatively inexpensive extrusion techniques. For example, an elongated extrusion may be formed having the shape of the cooler 10. Thereafter the elongated extrusion is transversely cut by conventional metal cutting techniques into equal or unequal sized coolers 10 as desired.

In use, a semiconductor device to be cooled may be mounted on either side of the mounting base 11 by a threaded stud and nut assembly or other convenient means extending through the bore 15.

Cooling air may either be forced to flow along the length of fins 14 or may flow there along by natural means. The fins 14 serve to dissipate heat conducted to the fins from the mounting base and semiconductor. The relationship of the fins to the axes 12 and 13 establish an exceptionally short thermal conduction path between the semiconductor and the root of each fin to enhance the thermal conductivity properties of the coolers.

It is evident that those skilled in the art may now make numerous modifications of and departures from the specific embodiments described herein without departing from the inventive concepts. For example, the fin size and configuration may be varied as may the size and configuration of the mounting base and bore 15. In some cases additional fins may be provided intermediate fins 14 and extending at angles from base 11. Varying numbers of fins and wings may be employed.

Consequently, the breadth of this invention is to be construed as limited only by the spirit and scope of the appended claims.

What is claimed is:

1. A cooling structure comprising a flat mounting base having first and second longitudinally extending side edges, a mounting means for an electrical device lying between said side edges on said base, fin root portions integral with each of said first and second side edges, a plurality of at least three substantially radially extending fins, each having roots, integral with each of said root portions, whereby the distance from each of said fin roots to said mounting means is substantially the same.

2. A cooling structure in accordance with claim 1 wherein each of said plurality of fins on each side edge consists of an equal number of fins having noninterconnecting free outer ends.

3. A cooling structure in accordance with claim 1 wherein said fins extend in substantially radial planes from said side edges and are disposed on both sides of a plane taken through said mounting base.

4. A cooling structure in accordance with claim 1 wherein said fins extend at acute angles from adjacent fins in radial planes.

5. A cooling structure in accordance with claim 4 wherein said fins extend outwardly of said edges on only one side of a plane taken through said mounting base.

References Cited by the Examiner

UNITED STATES PATENTS

| | | | |
|---|---|---|---|
| 2,815,472 | 12/1957 | Jackson et al. | 317—234 |
| 2,984,774 | 5/1961 | Race | 317—234 |
| 3,147,801 | 9/1964 | Katz | 165—80 X |

CHARLES SUKALO, *Primary Examiner.*